(12) United States Patent
Getta et al.

(10) Patent No.: US 9,302,734 B2
(45) Date of Patent: Apr. 5, 2016

(54) DRIVE DEVICE FOR AN ELECTRIC BICYCLE

(71) Applicant: Brose Fahrzeugteile GmbH & Co. KG, Coburg, Coburg (DE)

(72) Inventors: Udo Getta, Berlin (DE); Ullrich Noack, Berlin (DE); Karl-Heinz Fleischmann, Marienwerder (DE)

(73) Assignee: Brose Fahrzeugteile GmbH & Co. Kommandtigesellschaft, Coburg, Coburg (DE)

( * ) Notice: Subject to any disclaimer, the term of this patent is extended or adjusted under 35 U.S.C. 154(b) by 0 days.

(21) Appl. No.: 14/394,701

(22) PCT Filed: Apr. 15, 2013

(86) PCT No.: PCT/EP2013/057811
§ 371 (c)(1),
(2) Date: Dec. 17, 2014

(87) PCT Pub. No.: WO2013/156445
PCT Pub. Date: Oct. 24, 2013

(65) Prior Publication Data
US 2015/0101874 A1    Apr. 16, 2015

(30) Foreign Application Priority Data

Apr. 17, 2012  (DE) .................. 10 2012 103 355

(51) Int. Cl.
*B62M 9/06*    (2006.01)
*B62M 6/55*    (2010.01)
*B62M 11/14*   (2006.01)

(52) U.S. Cl.
CPC . *B62M 6/55* (2013.01); *B62M 9/06* (2013.01); *B62M 11/14* (2013.01)

(58) Field of Classification Search
CPC ........... B62M 6/55; B62M 9/06; B62M 11/14
USPC ....................................... 180/206.4
See application file for complete search history.

(56) References Cited

U.S. PATENT DOCUMENTS 5,570,752 A * 11/1996 Takata ................. 180/206.4
5,749,429 A *  5/1998 Yamauchi et al. ........ 180/206.4
(Continued)

FOREIGN PATENT DOCUMENTS

DE      40 27 365 A1    3/1992
DE      696 08 752 T2   11/2000
(Continued)

OTHER PUBLICATIONS

English translation of the International Preliminary Report on Patentability for application No. PCT/EP2013/057811, report issued Oct. 21, 2014, 8 pages.

*Primary Examiner* — Joseph Rocca
*Assistant Examiner* — Michael Stabley
(74) *Attorney, Agent, or Firm* — Lewis Roca Rothgerber Christie LLP

(57) ABSTRACT

A drive device for an electric bicycle with a drive housing in which a hollow shaft is mounted which is connected to a chain wheel of a chain drive of the electric bicycle, a pedal crankshaft arranged coaxial to the hollow shaft and is couplable thereto, which crankshaft is connected to pedal cranks on each of its two ends and an electric motor the output of which can be coupled to the hollow shaft via a traction mechanism drive which drive means comprises a belt drive with a flexible traction mechanism in the form of a toothed belt, a flat belt, or a V-belt, or said drive means comprises a chain drive with a flexible traction mechanism in the form of a single or double roller chain.

14 Claims, 7 Drawing Sheets

(56) References Cited

U.S. PATENT DOCUMENTS

| | | | |
|---|---|---|---|
| 5,845,727 A * | 12/1998 | Miyazawa et al. | 180/206.4 |
| 5,909,781 A * | 6/1999 | Yonekawa et al. | 180/206.4 |
| 6,039,137 A | 3/2000 | Schless | |
| 6,073,717 A * | 6/2000 | Yamamoto et al. | 180/206.4 |
| 6,152,251 A | 11/2000 | Nagai et al. | |
| 6,276,479 B1 * | 8/2001 | Suzuki et al. | 180/206.8 |
| 6,296,072 B1 * | 10/2001 | Turner | 180/220 |
| 6,554,730 B1 * | 4/2003 | Sakai et al. | 475/195 |
| 6,974,399 B2 * | 12/2005 | Lo | 475/5 |
| 7,059,989 B2 * | 6/2006 | Fukui | 475/149 |
| 2011/0303474 A1 | 12/2011 | Kimmich et al. | |

FOREIGN PATENT DOCUMENTS

| | | |
|---|---|---|
| DE | 10 2009 045 447 A1 | 6/2010 |
| DE | 10 2010 009 649 A1 | 9/2011 |
| EP | 0 763 462 A1 | 3/1997 |
| EP | 1 110 856 A2 | 6/2001 |
| EP | 2 216 242 A1 | 8/2010 |
| WO | WO 2010/022578 A1 | 3/2010 |

* cited by examiner

DRIVE DEVICE FOR AN ELECTRIC BICYCLE

CROSS-REFERENCE TO A RELATED APPLICATION

This application is a National Phase Patent Application of International Patent Application Number PCT/EP2013/057811, filed on Apr. 15, 2013, which claims priority of German Patent Application Number 10 2012 103 355.2, filed on Apr. 17, 2012.

BACKGROUND

The invention relates to a drive device for an electric bicycle, particularly for a pedelec driven by electric motor force as well as muscle force.

A drive device for an electric bicycle enables in principle three operating states:
- a bicycle operation, where muscle force alone is used as the drive means;
- an E-bike operation, where electric motor force alone is used as the drive means; and
- a pedelec operation employing muscle force assisted by electric motor force as the drive means, wherein the electric motor does not deliver an output without pedaling, with the exception of a use as a pushing or starting aid up to a speed of 6 km/h. For switching on or controlling the electric motor of a pedelec,
  - the force at the pedals, the pedal cranks, the chain, or the wheel, with the use of a signal from a force sensor, and also the torque to be sensed via torque sensors, which torque is transferred by the pedal crankshaft,
  - the pedaling speed, with the use of the signal from a rotational speed sensor,
  - the speed of the vehicle, with the use of sensors on the wheel or contactless sensors, or sensors which measure speed independently of the wheels, e.g. by radar or ultrasound, particularly for the purpose of shutting off the electric motor drive starting at a speed of 25 km/h (for pedelecs which are not subject to a license) or 45 km/h (for speed pedelecs);
  - the acceleration can be measured and the measurements can be processed further mechanically or electronically in order to switch the electric motor on or off or to control it continuously by means of a control function.

The power supplied to the electric motor is calculated by the motor control means based on the sensor data, depending on the selected degree of assistance, so that the electric motor automatically contributes a specified percentage of the power contributed by the rider. The degree of assistance or percentage of power delivered by the electric motor can be adjusted in a plurality of stages, or can be fixed by the manufacturer or a technician.

From EP 2 216 242 A1 is known a drive device with an electric drive for a bicycle driven by muscle force, comprised of a mounting sleeve anchored in a bushing of a frame part of the bicycle, a crankshaft, the ends of which are connected to cranks which are in turn connected to pedals, for muscle force operation, and a cylindrical drive element which is mounted coaxially to the crankshaft, in the mounting sleeve. The cylindrical drive element is comprised of an adapter disk on one end which disk is connected to a drive sprocket. A pedal crank freewheel, serving as a coupling which is dependent on the rotational direction, is disposed between the crankshaft and the cylindrical drive element, and the cylindrical drive element is connected to the rotor of an electric motor via a drive freewheel and a gear unit. Sensors are provided for determining the torque and the rotational speed of the crankshaft, which sensors send signals to an electronic control unit which makes a determination of the power contributed by the rider and controls the electric motor in assisting the rider.

Single-stage or multistage reduction gears are used for transmitting the force from the electric motor to the pedal crankshaft, in particular a single-stage or multistage spur gear or planetary gear, single-stage or multistage chain drives, single-stage harmonic drives, or a combination of these.

From DE 10 2009 045 447 A1 is known a bicycle with an electrical auxiliary drive, comprised of an electric motor, a battery connected to the electric motor for storing electrical energy, a crank assembly with pedal cranks connected to a pedal crankshaft that is disposed so as to be rotatable around a crankshaft axis, and a planetary gear for driving the bicycle with a combination of force from the electric motor and from the muscle force of a rider. The planetary gear and the electric motor which is connected to a sun gear of the planetary gear via a hollow shaft are disposed around the pedal crankshaft of the crank drive, which crankshaft is disposed inside the hollow shaft and is connected either to a planetary gear carrier or to the ring gear of the planetary drive. In order to optimize the torque, the bicycle has a gear shift formed as a derailleur or a hub gear connected to the planetary gear.

A drawback connected with the use of a single-stage or multistage spur gears or chain gears is the large amount of installation space needed to accommodate these types of drives, the increased material use required thereby for the drive housing components, and the substantial amount of space needed for connecting the drive device to the bicycle frame. When the drive device is mounted in the area of the pedal crankshaft, this leads to projecting parts of the drive housing which pose hindrances in transporting the bicycle. A further drawback connected with the use of gear drives or chain drives is the inconvenient amount of noise emitted, and in the case of gear drives, as a result of the rigid connection of the electric motor with the pedal crankshaft, high vulnerability to shocks, caused, e.g., by switching surges of the derailleur or the hub gear of the bicycle.

Chain stages of a single-stage or multistage chain drive disposed outside the drive housing are susceptible to external influences, and they increase the risk of injury. The use of a single-stage harmonic drive gear leads to increased costs and a reduction of the efficiency.

EP 0 763 462 B1 discloses an auxiliary drive for a bicycle, which is comprised of a frame with a bottom bracket, a seat tube, a lower tube, a head tube, an upper tube, a pair of chain bars, and a pair of seat bars. The lower tube, seat tube, and chain bars intersect at a bottom bracket with a crankshaft, the ends of which are connected to crank arms. The auxiliary drive comprises an electric motor, a power transmission belt, and a gear train comprised of a plurality of spur gears, which gear train is coupled on its end side to the crankshaft. The auxiliary drive is disposed in a housing having a flat, elongated shape, with two semicircular ends, which housing is comprised of an inner and an outer housing, both of which have an elongated pan-shaped configuration. The inner housing extends forward from the bottom bracket of the bicycle frame along the lower tube, and is open on a side opposite to the lower tube. The outer housing is also open, on the side opposite to the opening of the inner housing, and has a recess into which the open end of the inner housing fits. The inner and outer housing are interconnected by a combination of a plurality of screws.

As a result of the reducing drive comprised of a gear train with a plurality of intermeshing spur gears, and the associated elongated plate-shaped housing components, the housing extends far below the lower tube, from the bottom bracket, which causes a substantial reduction in the ground clearance in the area of the bottom bracket, and consequently, when the bicycle is transported over irregularities in the ground, there is an increased risk of collision with obstacles such as stairs, curbs, and the like.

SUMMERY

The underlying problem of the present invention was to devise a drive device for an electric bicycle of the general type described supra, wherein the drive housing can be optimally integrated into the frame of the bicycle, has small external dimensions and low weight, as well as good accessibility, and performs a supporting function in the load-bearing structure of the frame, wherewith the functional elements of the device have a high degree of efficiency, and are distinguished by low noise generation and maximum shock absorption of the drive means.

The inventive drive device for an electric bicycle has a drive housing which can be optimally integrated into the frame of the electric bicycle, has small external dimensions, low weight, and good accessibility, and performs a supporting function in the load-bearing structure of the frame, wherewith the functional elements of the device have a high degree of efficiency, and are distinguished by low noise generation and maximum shock absorption of the drive means.

By the use of a traction mechanism drive to connect the electric motor to the hollow shaft which drives the chain drive of the electric bicycle, the motor shaft and the pedal crankshaft with the coaxial hollow shaft can be disposed in succession with respect to the longitudinal direction of the frame of the electric bicycle but separated from each other; this arrangement allows the drive housing to have a narrow elongated structure. Further, the traction mechanism drive provides high efficiency and enables a high degree of reduction of the rotational speed, permitting one to employ a high-rotational-speed electric motor of compact dimensions, thereby achieving a minimal installation volume of the drive device.

This type of integration of the drive housing into the frame of the electric bicycle allows the hybrid drive to perform a supporting function in the bicycle frame, wherewith it replaces the "bottom bracket housing" of an electric bicycle that does not have a drive device, so that the frame geometry of a bicycle that does not have an electric motor drive device can be essentially preserved, and in particular it is unnecessary to lengthen the wheelbase.

An optimal integration of the drive housing of the hybrid drive into the bicycle frame means, among other things, that the drive housing does not have any components which significantly project from the normal bicycle frame, which otherwise would reduce the ground clearance in the area of the bottom bracket and would increase the risk of collision with irregularities in the travel path.

For this reason, the drive housing has a housing frame with an enclosing profile which has pipe flanges formed on it which connect to the seat tube, lower tube, and the lower stays of the rear structure of the bicycle frame, and accommodates the electric motor and the reducing drive, plus the switching couplings dependent on the rotational direction, as well as the sensor transducers [or the like]. Despite the minimal exterior dimensions of length and structural depth, which require a structure of the hybrid drive having a minimal axial distance between the motor shaft and the hollow shaft, and optimal mutual configurations of the drive components as well as the housing of the electric motor, the drive housing accommodates all of the parts of the hybrid drive and provides a high degree of speed reduction.

Advantageously, the pipe flanges are connected to the seat tube, the lower tube, and the lower stays of the rear structure by means of welded or soldered connections.

The housing covers which close off the housing frame on both sides have openings to accommodate the ends of the pedal crankshaft, so that the preassembled drive device is inserted into the housing frame connected to a first housing cover and is encapsulated by the second housing cover connected to the housing frame.

According to a first variant, the traction mechanism drive of the drive device is comprised of a belt drive with a flexible traction mechanism in the form of a toothed belt, flat belt, or V-belt.

Configuring the traction mechanism drive as a belt drive minimizes the noise generation and the weight, of the drive device. In combination with a compact lightweight electric motor, the inventive drive device is distinguished by low total weight and small external dimensions.

Alternatively, according to a second variant, the traction mechanism drive of the drive device is comprised of a single-stage chain drive with a flexible traction mechanism in the form of a single or double roller chain.

In order to provide a high degree of speed reduction with use of a compact high-rotational-speed electric motor which delivers a high torque to the hollow shaft which is coupled to the drive sprocket of the electric bicycle, the traction mechanism drive comprises one drive stage of a multistage drive means, wherewith the traction mechanism drive may be employed as the first drive stage, second drive stage, or a subsequent drive stage of the multistage drive.

A further embodiment of a multistage drive presents a spur-toothed or helically toothed spur gear drive means or planetary gear drive means.

According to a further embodiment, the first drive stage is comprised of a spur-toothed or helically toothed single-stage planetary drive means having a fixed ring gear which has planetary gears which are connected to a planetary gear carrier, and which mesh with a sun gear which is connected to the motor shaft of the electric motor, which planetary gears also run over the interior toothing of said ring gear; and the second drive stage is comprised of a traction mechanism drive having a traction mechanism drive gear which is connected to the planetary gear carrier and is rotatably mounted on an extension of the motor shaft.

The use of a planetary drive means as one drive stage of a multistage drive allows a compact structure which has a small installed volume and can be variably configured for small and large torques and for high and low drive rotational speeds, as well as coaxial alignment of the drive gear and driven gear, so that the driven gear of the planetary drive means can serve the function of a drive gear for the traction mechanism drive and simultaneously can be disposed coaxially to the motor shaft of the electric motor, thereby providing a compact installed structure. This satisfies the precondition for optimal adjustment of the drive housing to the design of the bicycle.

Advantageously, the traction mechanism drive presents the traction mechanism drive gear which is connected to the planetary gear carrier of the planetary drive means, further presents the traction mechanism which engages the traction mechanism drive gear, and presents a traction mechanism driven gear which engages the flexible traction mechanism and is couplable to the hollow shaft via the second switched coupling dependent on the rotational direction.

In order to provide the maximum wrap angle of the traction mechanism around the traction mechanism driven gear and thereby to provide for minimal surface contact force in meshing between the traction mechanism and the toothing of the traction mechanism drive gear or traction mechanism driven gear, a deflecting device may be provided between the traction mechanism drive gear and the traction mechanism driven gear, which deflects the traction mechanism.

The deflecting device which deflects the traction mechanism is preferably pre-tensioned in the direction of increasing the wrap angle of the traction mechanism drive gear and/or of the traction mechanism driven gear.

The pre-tensioning provided by the deflecting device which deflects the traction mechanism provides automatically adjusting tensioning of the flexible traction mechanism and thereby provides for secure intermeshing between the toothing of the traction mechanism drive gear and the traction mechanism, and between the traction mechanism driven gear and the traction mechanism, even in the event that the flexible traction mechanism becomes stretched, particularly in the event that the flexible traction mechanism comprises a toothed belt or a flat belt or V-belt.

Alternatively, the deflecting device which deflects the traction mechanism may be fixedly disposed, wherewith it may be adjustable by, e.g., support means provided in a slot.

The multistage drive may be realized with various types of drive means (transmission means) and combinations of drive means (transmission means).

According to a first variant, the first drive stage has a single-stage spur-toothed or helically toothed spur gear drive and the second drive stage has a single-stage belt drive having a toothed belt, flat belt, or V-belt.

According to a second variant, the first drive stage has a single-stage spur-toothed or helically toothed spur gear drive and the second drive stage has a single-stage chain drive with a single or double roller chain.

According to a third variant, the first drive stage has a single-stage spur-toothed or helically toothed planetary drive means and the second drive stage has a single-stage belt drive having a toothed belt, flat belt, or V-belt.

According to a fourth variant, the first drive stage has a single-stage spur-toothed or helically toothed planetary drive means and the second drive stage has a single-stage chain drive with a single or double roller chain.

BRIEF DESCRIPTION OF THE DRAWINGS

The underlying concept of the invention will be described in more detail, with reference to the exemplary embodiments illustrated in the drawings.

DETAILED DESCRIPTION

The electric drive 1, of the hybrid drive type, driven by an electric motor and also by muscle force, which is shown three dimensionally and with the drive housing 7 partially cut away, in various views in FIGS. 1-5, and having freewheel or back-pedaling function means, is connected to the frame of an electric bicycle, particularly a "pedelec" or "E-bike", or is integrated into the frame of said bicycle.

Figure 1:
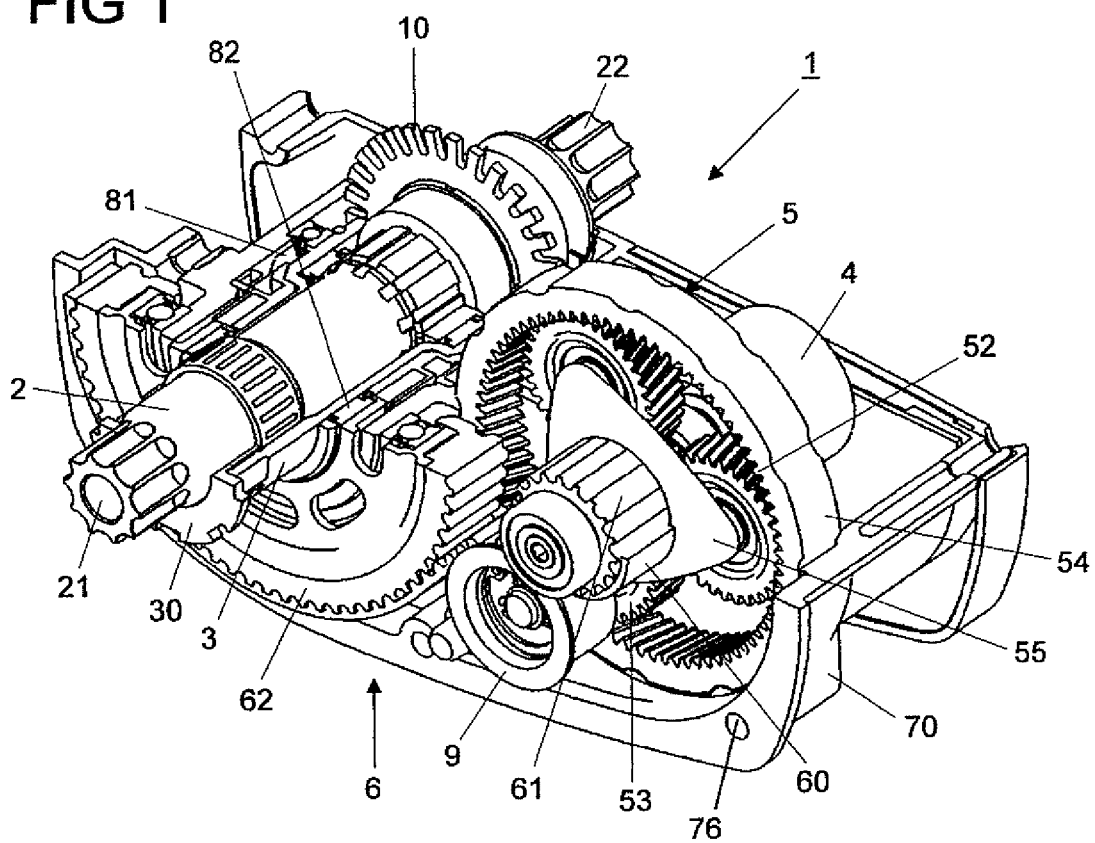
FIGS. 1-4 show a partial cutaway perspective view of a drive device with a two-stage drive comprising a planetary drive and a traction mechanism drive, from different views.
Figure 2:
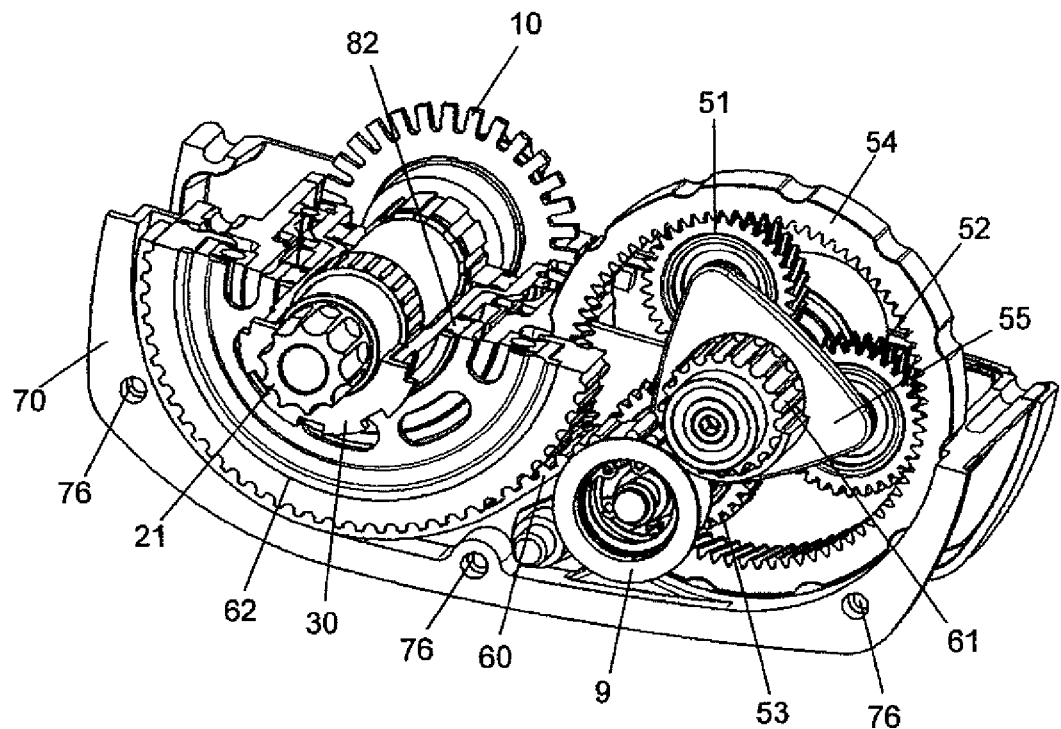
Figure 3:
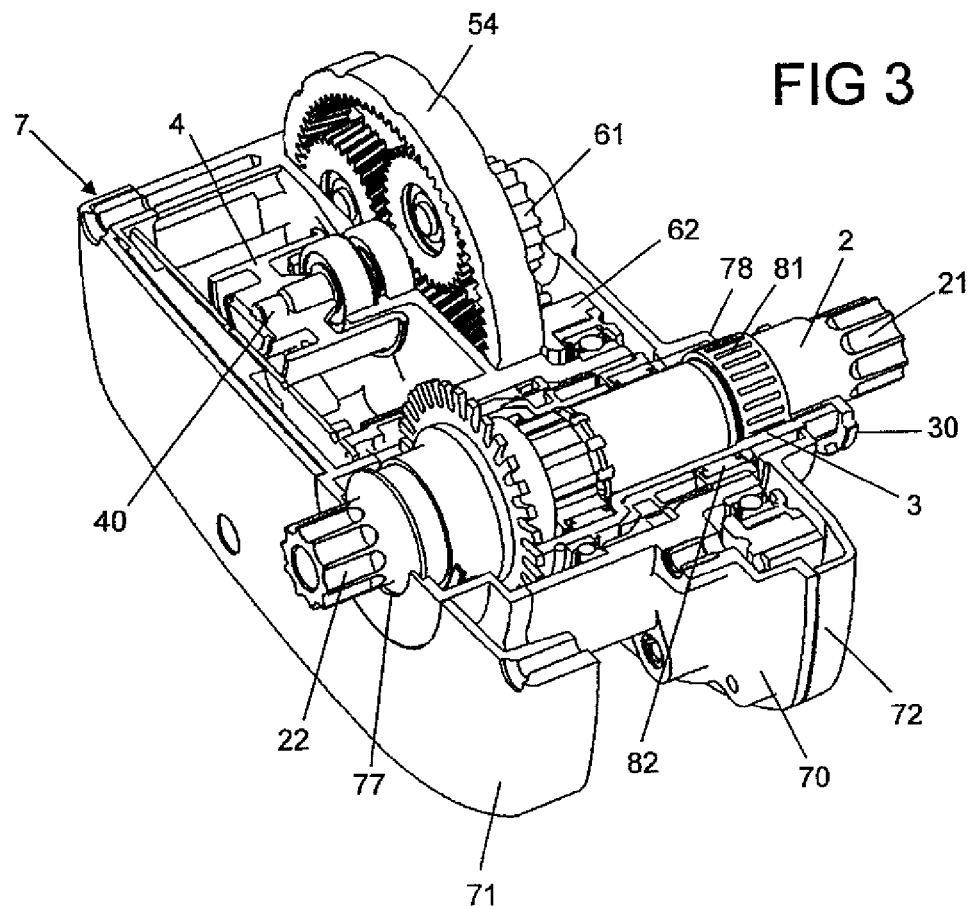
Figure 4:
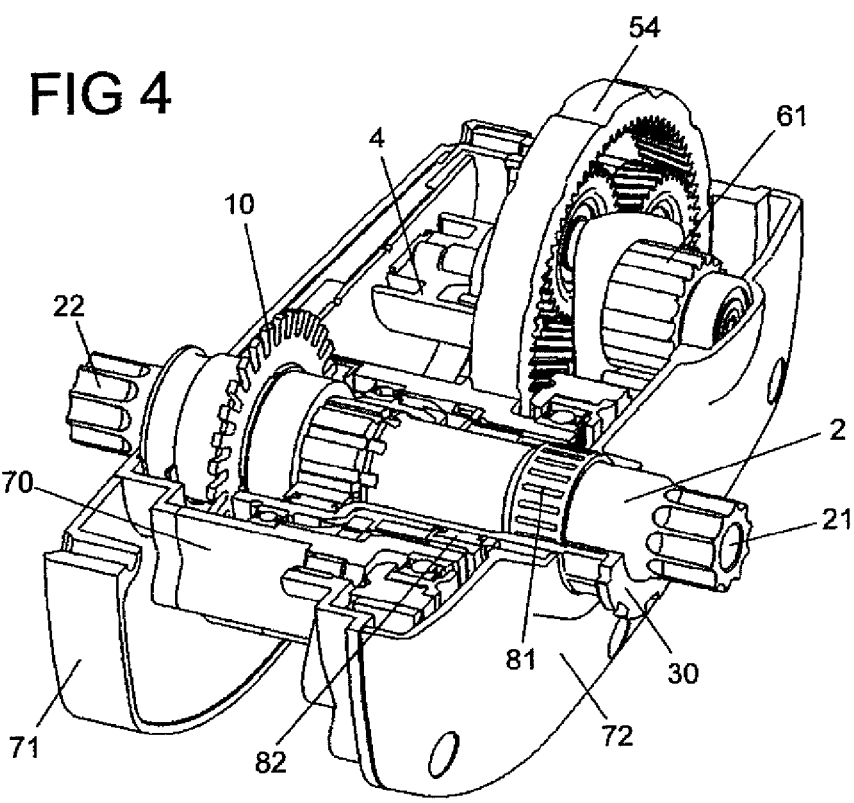
Figure 5:
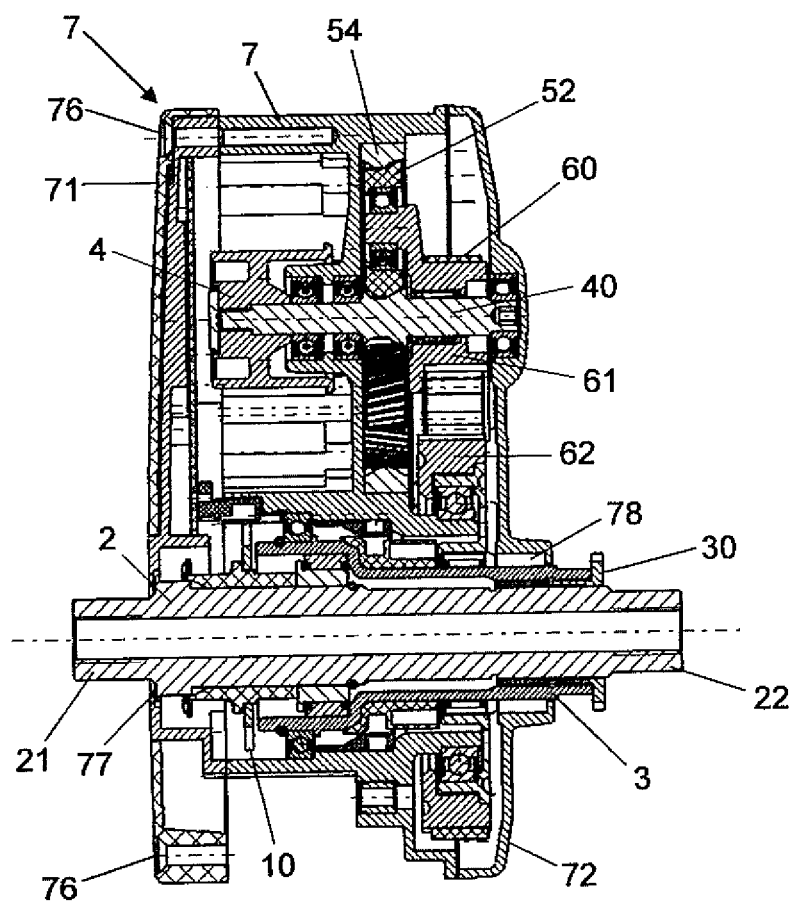
FIG. 5 shows a longitudinal cross section through the drive device according to FIGS. 1 to 4.

The drive housing 7 is comprised of a housing frame 70 integrated into the frame of the electric bicycle, and housing covers 71 and 72 which are connected to the housing frame 70. The housing frame 70 according to FIGS. 1 and 2 has an enclosing profile with a plurality of threaded holes 76 which accommodate screws for attaching the housing covers 71 and 72. In FIGS. 3 and 4, the drive housing 7 is shown in a half-cutaway perspective view, and in FIG. 5 the drive housing is shown in a longitudinal cross section with the drive device disposed inside.

Figure 10:
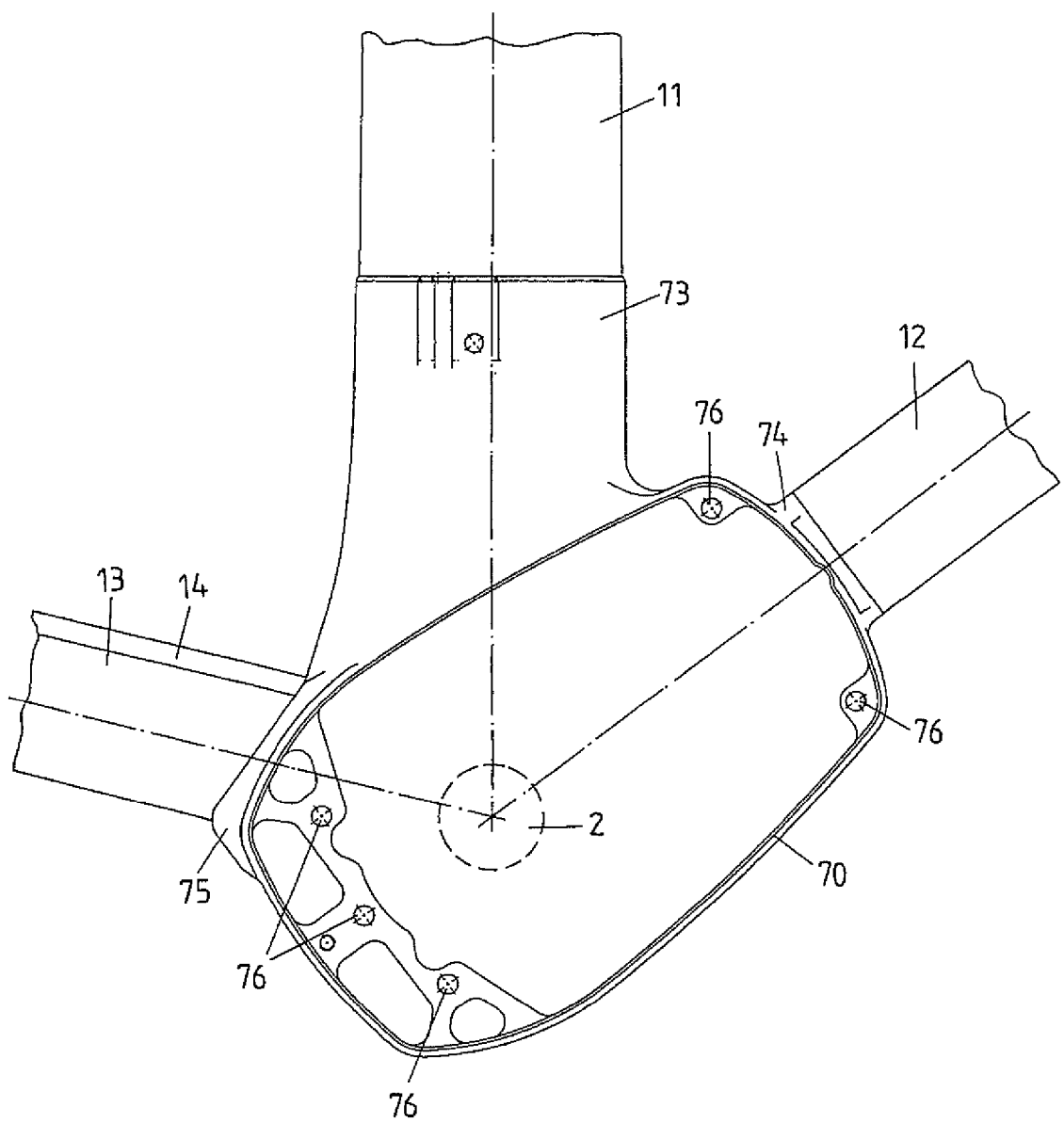
FIG. 10 shows a schematic representation of the integration of the drive housing into the frame geometry of the electric-drive bicycle.

According to FIG. 10, pipe flanges 73, 74, and 75 are preferably formed in one piece on the housing frame 70, are connected to the electric bicycle, preferably by welding or soldering, with a first pipe flange 73 being connected to the seat tube 11 which bears the seat support and ultimately supports the bicycle seat, further with a second pipe flange 74 being connected to the lower tube 12, and with a third pipe flange 75 being connected to the lower stays 13 and 14 of the rear structure of the frame of the electric bicycle.

One of the two housing covers 71 or 72 is mounted on the housing frame 70 which is integrated into the frame of the electric bicycle, and then the preassembled drive 1 is inserted into the housing frame 70 from the opposite side, wherewith one end of the pedal crankshaft 2 is inserted through an opening 77, 78 of the housing cover 71 or 72 connected to the housing frame 70. Then the opening 77 [or] 78 of the second housing cover 71 or 73 is placed over the other end of the pedal crankshaft 2, and this housing cover 71 or 72 is attached to the housing frame 70 by means of screws screwed into the threaded holes 76.

The housing frame 70 as a welded piece (FIG. 10) takes on a load-bearing function in the overall framework of the electric bicycle, and replaces the pedal bearing housing of a bicycle without an electric motor drive, wherewith the housing frame 70 ensures that the frame geometry of a bicycle not equipped with a drive device 1 is maintained, i.e. among other things no wheelbase extension is required, because the center axes of the seat tube 11, the lower tube 12, and the lower stays 13 and 14 of the rear structure of the electric bicycle intersect at the pedal crankshaft 2, as indicated by dashed lines in FIG. 10.

The drive device 1 comprises a pedal crankshaft 2 according to FIGS. 1 to 5, the crank pins 21 and 22 of which are connected to pedal cranks (not shown) which are provided at their ends with muscle-force-operated pedals which transfer to the pedal crankshaft 2 a torque generated by muscle force.

The pedal crankshaft 2 is connected to a hollow shaft 3 which is disposed coaxially to the pedal crankshaft 2 and is rotatably mounted in the drive housing 7, via a first switched coupling 81 in the form of a "wedge freewheel", which shaft 3 has a chain sprocket 30 disposed on one end, which sprocket transmits the drive force (drive torque) via a chain to a receiving chain sprocket (or a derailleur or hub transmission) connected to the rear wheel of the electric bicycle.

The electrical drive force is generated by an electric motor 4 controlled by control electronics and supplied with electric power by a storage battery, not shown, which is integrated into the frame of the electric bicycle or, e.g., is connected to the luggage rack on the bicycle.

The torque produced by the motor shaft 40 of the electric motor 4 is transmitted to the hollow shaft 3 via a two-stage drive means 5 and 6, and a coupling 82 which is in the form of a wedge freewheel and is switched depending on the direction of rotation. The two-stage drive means 5 and 6 serves to step down the rotational speed of the electric motor 4, so that one can employ a relatively high speed electric motor 4 of compact dimensions, to minimize the weight and size of the drive device 1.

The two-stage drive means 5 and 6 has in its first stage a planetary drive means 5 and in its second stage a traction mechanism drive 6. As seen in particular in the schematic representation according to FIG. 8, the planetary gear means 5 is comprised of a sun gear 50 which is connected to the motor shaft 40 of the electric motor 4 and is preferably of the helically toothed type, three helically toothed planetary gears 51, 52, and 53 which meshingly engage the sun gear 50, are offset from each other by 120°, and are rotatably mounted on a planetary gear carrier 55, and a fixed ring gear 54 the helical-type internal teeth of which mesh with the helical-type external teeth of the planetary gears 51, 52, and 53. The planetary gears 51, 52, and 53 are rotatably mounted on axes 56, 57, and 58 on the planetary gear carrier 55.

The planetary gear carrier 55 is connected to a traction mechanism drive gear (or drive pulley) 61 of the traction mechanism drive 6 which forms the second drive stage. The motor shaft 40 of the electric motor 4 is rotatably mounted in a bore in the traction mechanism drive gear 61.

The traction mechanism drive 6 is comprised of the traction mechanism drive gear 61 which is fixedly connected to the planetary gear carrier 55, and a traction mechanism driven gear (or driven pulley) 62 with outer toothing, which gear can be coupled to the hollow shaft 3 via the second switched coupling 82 which is switched depending on the direction of rotation. A flexible traction mechanism 60 engages the outer teeth of the traction mechanism drive gears 61 and 62. Since the traction mechanism drive 6 is intended to cause a reduction of the rotational speed of the electric motor 4, the traction mechanism drive gear 61 has a smaller diameter or smaller number of teeth than the traction mechanism drive gear 62. The flexible traction mechanism 60 is passed over a deflecting roller 9 disposed between the axis of the traction mechanism drive gear 61 and the axis of the traction mechanism drive gear 62, which roller is disposed between the tension type drive gears 61 and 62 such that the wrapping angle of the flexible traction mechanism 60 around said drive gears 61 and 62 is increased.

The deflecting roller 9 may be fixedly disposed or may be spring-loaded in the direction of increasing the wrapping angle. If the deflecting roller 9 is fixedly disposed, preferably, the axis of the deflecting roller 9 is mounted in an elongated slot, so that, with appropriate orientation of the elongated slot, it is possible to readjust the deflecting roller 9 to increase the "wrapping angle". If the deflecting roller 9 is spring-loaded, automatic readjustment is made for the stretching of the flexible traction mechanism 60 which occurs during operation, and thereby the tension of the flexible traction mechanism 60 is maintained, and with an increase in the wrapping angle a prescribed force of the toothing of the flexible traction mechanism 60 against the outer toothing of the traction mechanism drive gears 61 and 62 is ensured.

The traction mechanism drive 6 may be in the form of a single-stage belt drive with a toothed belt, flat belt, or V-belt, or a single-stage chain drive with a single or double roller chain.

Figure 6:
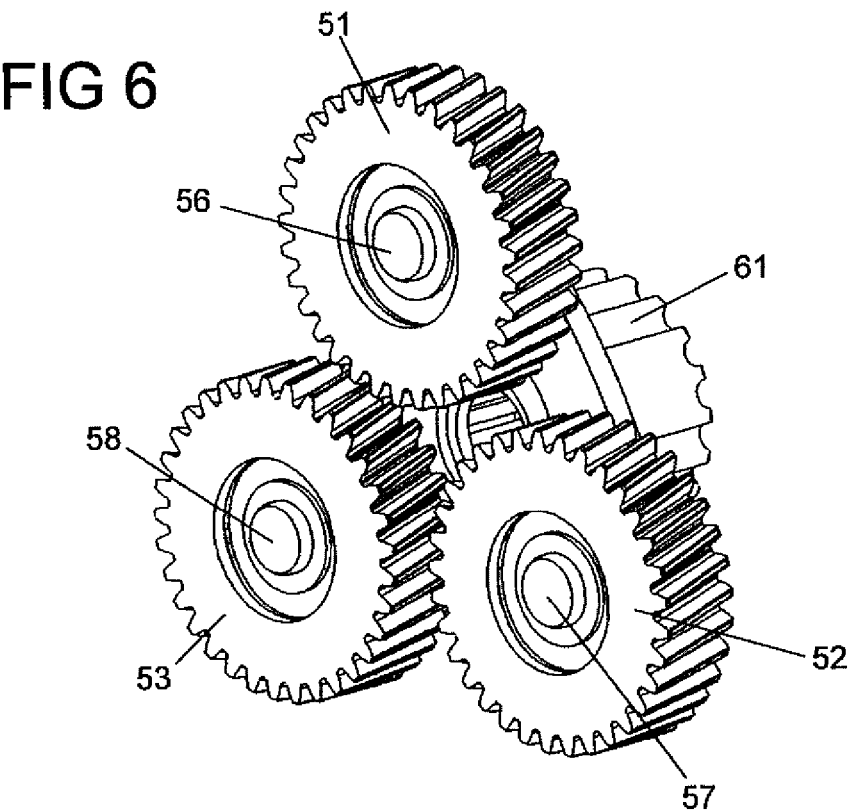
FIGS. 6-7 show a perspective illustration of the traction mechanism drive wheel, the planetary gear carrier, and the planetary gears of the planetary drive from different viewing directions.
Figure 7:
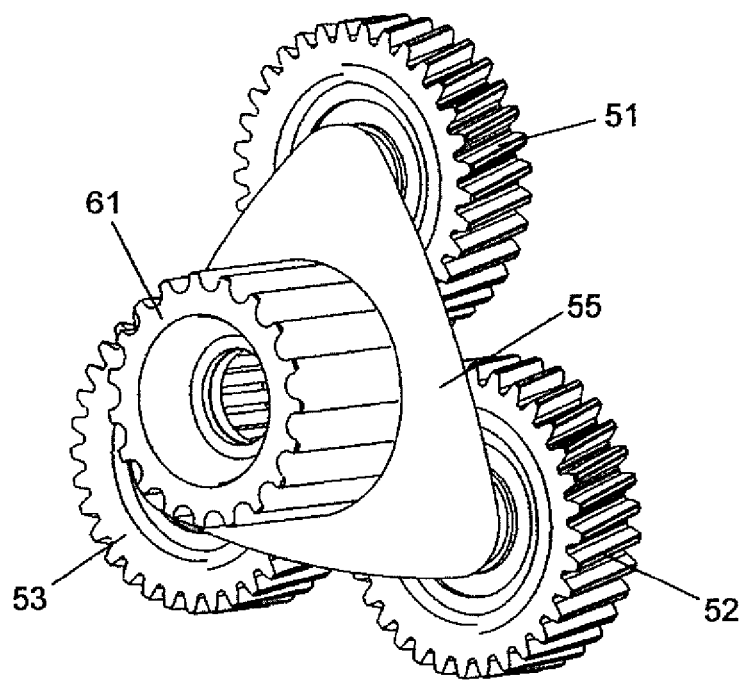
Figure 8:
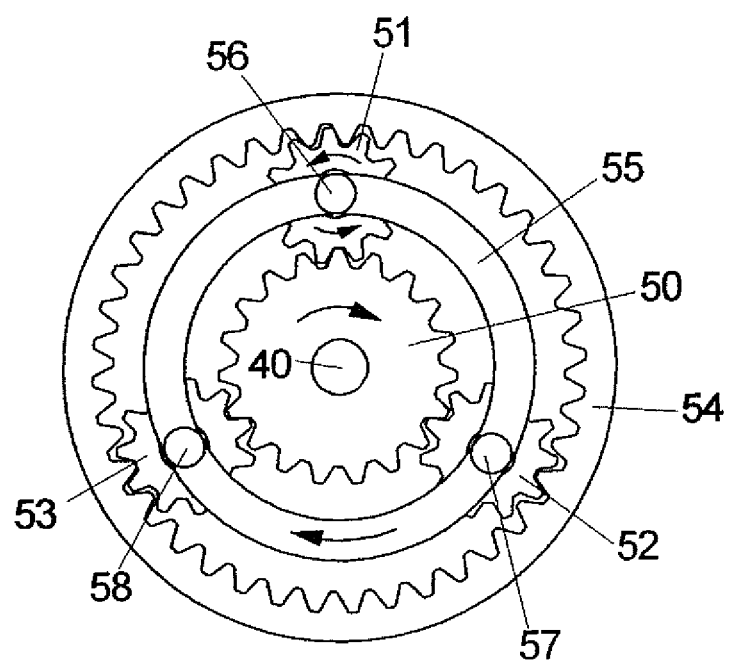
FIG. 8 shows a schematic functional representation of the planetary drive means according to FIGS. 1-7.

The planetary drive 5 illustrated schematically in FIG. 8 is comprised of the sun gear 50 which is centrally disposed and is connected to the motor shaft 40, and is further comprised of the ring gear 40, the three planetary gears 51, 52, and 53 at 120° intervals, and the planetary gear carrier 55. The planetary gears 51, 52, and 53, which are rotatably mounted on the axles 56, 57, and 58 (FIGS. 6 and 7), have their outer toothing meshing with the outer toothing of the sun gear 50 and with the inner toothing of the ring gear 54. When the sun gear 50 is driven in the clockwise direction, the planetary gears 51, 52, and 53 rotate counterclockwise, but the planetary gear carrier 55 rotates clockwise.

If the planetary drive means 5 is employed as the first drive stage of the multistage drive means 5 and 6, the sun gear 50, which is connected to the motor shaft 40, is driven with a rotational speed $n_1$, whereas the torque delivered from the planetary drive carrier 55 has a rotational speed $n_2$, with rotational speed $n_2$ corresponding to the rotational speed of the traction mechanism drive gear 61 which is fixedly connected to the planetary drive carrier 55, which gear 61 comprises the second drive stage of the multistage drive means 5 and 6. In this embodiment, the ring gear 54 is fixedly disposed and is connected to the drive housing 7. With this arrangement of the planetary drive means 5, speed reductions up to $i=n_1/n_2=10$ are possible.

Figure 9:
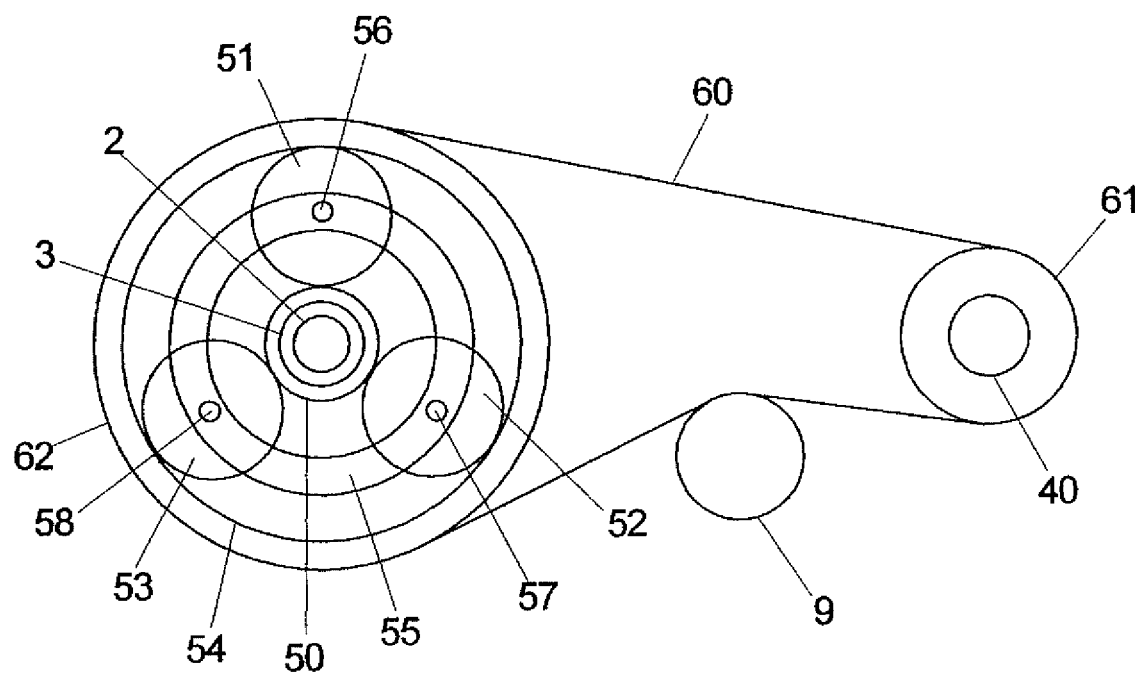
FIG. 9 shows a schematic representation of a two-stage drive with a single stage traction mechanism drive in the first drive stage and a planetary drive means in the second drive stage.

FIG. 9 is a schematic representation of an alternative embodiment of the two-stage drive, where the drive types have been reversed.

Whereas in the embodiment according to FIGS. 1 to 5 the first drive stage comprises a planetary drive means 5, with a sun gear 50 connected to the motor shaft 40 of the electric motor, and with a planetary gear carrier 55 driving the second drive stage which comprises the traction mechanism drive 6, according to the embodiment illustrated in FIG. 9 the first drive stage comprises a traction mechanism drive 6 which drives the second drive stage comprised of a planetary drive means 5.

The traction mechanism drive means 6 has a tensile-type drive gear 61 of small diameter and with a small number of teeth, which gear 61 is connected to the motor shaft 40, and a second tensile-type drive gear 62 of large diameter and with a large number of teeth, which gear 62 is disposed coaxially with the pedal crankshaft 2 and the hollow shaft 3, wherewith the gear 62 is connected to the traction mechanism drive gear 61 via a flexible traction mechanism 60, and wherewith the traction mechanism drive 6 may be in the form of a single-stage belt drive with a toothed belt, flat belt, or V-belt, or a single-stage chain drive with a single or double roller chain.

The traction mechanism driven gear 62 associated with the traction mechanism drive is fixedly connected to a sun gear 50 of the second drive stage which is in the form of a planetary drive means 5, which sun gear, analogously to the embodiment illustrated in FIGS. 1-8, meshes with three planetary gears 51, 52, and 53 disposed at 120° intervals. The planetary gears 51, 52, 53 are rotatably mounted on a planetary gear carrier 55, and said planetary gears mesh with the internal teeth of a ring gear 54 fixed to the housing. The planetary gear carrier 55 is couplable to the hollow shaft 3 via the second switching coupling 82 which switches depending on the direction of rotation.

In order to achieve further reduction of the speed, the planetary gear carrier 55 may be connected to the sun gear of a subsidiary planetary drive means which forms a third drive stage of the multistage drive means, which subsidiary planetary drive means is configured similarly to the above-described planetary drive means. The planetary gear carrier of this drive means is then couplable to the hollow shaft 3 via the second switching coupling 82 which switches depending on the direction of rotation, which shaft 3 is driven by the electric motor through the multistage drive means when, e.g., the speed of the electric bicycle is less than or equal to 6 km/h or when it is desired [for some other reason] to connect the electric drive to the pedal crank drive and a corresponding torque is being exerted by the pedal crankshaft 2 on the hollow shaft 3.

According to another alternative, a third drive stage of the multistage drive means may be in the form of a traction mechanism drive, with its traction mechanism drive gear connected to the planetary gear carrier of the planetary drive means, wherewith a traction mechanism drive gear is driven by a traction mechanism having its axis coaxial to the hollow shaft and the pedal crankshaft, which axis [sic] is provided between the motor axis 40 and the axis of the planetary drive means 5.

Now the functioning of the drive device 1 illustrated in FIGS. 1 to 5 will be described in more detail.

As the direction of rotation of the electric motor drive comprised of the electric motor 4 and the two-stage drive means 5 and 6 will always correspond to the forward direction of travel of the electric bicycle, a factor in the application of a torque produced by the electric motor to the hollow shaft 3 is the difference in rotational speed between that of the hollow shaft and that of the pedal crankshaft 2. If the rotational speed of the driven gear (output gear) 52 of the electric motor drive is greater than the rotational speed of the hollow shaft 3, then the second switched coupling 82 which is dependent on rotational speed rigidly couples the electric motor drive to the hollow shaft by locking of the sprags of the said second switched coupling 82, wherewith the sprocket which is fixedly connected to the hollow shaft 3 transfers the torque from the electric motor to the chain drive.

If, through lack or dearth of application of muscle force to the pedal crankshaft 2 the crankshaft is motionless or is operating at a lower rotational speed than the hollow shaft 3, the first switched coupling 81 which is dependent on the direction of rotation decouples the hollow shaft 3 from the pedal crankshaft 2, so that no torque is transmitted from the electric motor drive to the pedal crankshaft 2 and thus no forces are exerted [therefrom] on the pedals connected to the pedal crankshaft. This decoupling function can be applied directly to electric motor driven travel in "E-bike operation" or in the form of providing a boost when coasting or bringing the bicycle up to speed, for a pedelec at up to 6 km/hr. If the inventive drive device is used for a pedelec, when operating in pure electric motor drive mode at a speed greater than the established coasting or bringing-up-to-speed speed of 6 km/hr, or after a prescribed period of time, the electric motor 4 is disconnected from the control electronics.

When the drive device 1 is used for a pedelec, it is necessary to allocate the output employed for forward driving of the pedelec between an output fraction produced by the electric motor and applied to the hollow shaft 3 via the second switched coupling 82 dependent on the rotational direction, on the one hand, and an output fraction produced by muscle force and applied to the hollow shaft 3 via the first switched coupling 81 dependent on the rotational direction. In the process, the rotational speed of the hollow shaft 3 and thereby the rotational speed of the [drive] sprocket for the chain drive of the rear wheel is determined by the rotational speed of the pedal crankshaft 2, which depends on the muscle force exerted by the rider.

The torque delivered by the pedal crankshaft 2 results from the sum of the two torque components provided by the pedal cranks, and is transferred to the hollow shaft 3 in the region between the two switched couplings 81 and 82 which are dependent on the rotational direction. In this connection, if a torque sensor is disposed between the two switched couplings 81 and 82 which are dependent on the rotational direction, disposed at the outer perimeter of the hollow shaft, one can determine the torque delivered by the pedal crankshaft 2. Also, a sensor is provided for determining the rotational speed and rotational direction of the pedal crankshaft 2, which sensor is comprised of a toothed disk 10 for influencing the "magnetic resistance" and a Hall sensor, whereby when the toothed disk 10 is rotated sensor signals are sent to the control electronics of the hybrid drive.

Based on the torque and rotational speed determined by the sensors, the control electronics can determine the output delivered by the rider through his/her muscle force, and the control electronics controls the output delivered by the electric motor 4 in assistance to the rider. Control means may be employed to establish and control the allocation of output between that produced by the rider through muscle force and the output of the electric motor drive, i.e. the degree and percentage of assistance provided by the electric motor 4.

In a pure bicycle operation, a torque is transmitted to the pedal crankshaft 2 via the pedal cranks, which crankshaft, due to the rotational movement being in the forward direction, is rotationally rigidly connected to the hollow shaft 3 via the first switched coupling 81 dependent on the direction of rotation, so that the torque delivered by the pedal crankshaft is transferred to the sprocket and thereby to the chain drive of the electric bicycle.

If the rider does not exert any force on the pedals, whereby no torque is present in the pedal crankshaft from the pedal cranks, then ordinarily the decoupling function connected to the receiving chain sprocket on the rear wheel will be in effect, so that no rotational movement is transmitted via the chain drive to the sprocket.

When the bicycle is being operated with electric motor assistance, in addition to the torque delivered to the hollow shaft 3 from the pedal crankshaft 2 via the first switched coupling 81 dependent on the rotational direction, a second torque, produced by the electric motor drive, is delivered to the hollow shaft 3 via the traction mechanism driven gear 62 and the second switched coupling 82 dependent on the rotational direction, so that the torque available for forward advance of the bicycle at the sprocket which is fixedly connected to the sprocket flange 30 of the hollow shaft 3 is the sum of the two torques.

In the case of a purely electric motor drive, a torque is transmitted to the hollow shaft 3 via the traction mechanism driven gear 62 and the second switched coupling 82 dependent on the rotational direction, and is thereby is transmitted to the [drive] sprocket which is connected to the hollow shaft 3. Under these circumstances, the pedal crankshaft 2 may be motionless, so that the effective direction of a freewheel device is opposite to the effective direction of the freewheel device described above in connection with "bicycle operation".

In order to determine the speed of the bicycle in relation to the maximum permissible speed of 6 km/hr for exclusively electric motor drive of a pedelec when the pedal mechanism is merely coasting or the electric motor drive is serving to bring the bicycle up to speed, or in relation to the maximum legally permissible speed of 25 km/hr under conditions of electric motor assisted hybrid operation of a pedelec, one needs sensors which send sensor signals to the operative control electronics. Accordingly, in addition to the above-described sensor means for determining the rotational speed and torque of the pedal crankshaft 2, sensor means are provided for determining the speed of travel of the pedelec, which information is used for operating the pedelec.

If the bicycle is operated at a greater speed than the maximum permissible startup speed of 6 km/h, or when the bicycle has been operated [with electric assist] for an excessive amount of time, the electric motor is shut off by the control electronics. In the absence of [this] limitation through the control electronics, the inventive drive device could achieve pure electric drive operation of the electric bicycle, or E-bike operation.

The above-described drive device for a pedelec with freewheel operation may additionally or alternatively be equipped with a device for actuating a coaster brake. The elements for actuating such a coaster brake operate in a manner such that it is possible to rotate the hollow shaft 3 which is fixedly connected to the [drive] sprocket in a direction opposite to that used for forward driving of the electric bicycle.

In this connection, means must be provided to bypass the first switched coupling 81 dependent on the rotational direction, which would otherwise prevent reverse rotation of the hollow shaft 3, which bypass will occur during the time of actuation of the coaster brake, such that a torque from the pedal crankshaft 2 connected via the pedal cranks to the muscle-force-driven pedals of the pedelec can be transmitted in the opposite direction to the hollow shaft 3. During the time of actuation of the coaster brake, the electric motor drive is connected to the hollow shaft 3 with regard to this direction of rotation via the second switched coupling 82 dependent on the direction of rotation, with the connection being such that no torque is transmitted from the hollow shaft 3 to the electric motor drive. At the same time, when the coaster brake is actuated the electric motor 4 is shut off, because otherwise the motor would deliver a torque which would oppose the actuation of the coaster brake.

The electric motor drive is switched off namely by the control electronics which control the electric motor 4, in connection with the sensor determination of the rotational speed and rotational direction of the pedal crankshaft 2 connected to the pedal cranks, independently of the rotational speed of the hollow shaft 3 which is fixedly connected to the [drive] sprocket, wherewith the control electronics shut off the electric motor 4 when it is determined that the direction of the torque for forward operation of the pedelec, determined by the sensor(s), which torque is applied to the hollow shaft 3, has reversed, and thereby it is assured that the electric motor will no longer affect the operation of the bicycle when the coaster brake is actuated.

The above-described drive device 1 can be optimally integrated into the frame of an electric bicycle, due to its compact structure. The at least two-stage drive enables appreciable assistance at a maximum degree of efficiency, as well as appreciable [rotational] speed reduction, enabling use of a high rotational speed electric motor of compact size, to minimize the installed volume of the drive device 1. The use of a traction mechanism drive in the multistage drive assists in achieving a compact structure of the drive device 1, as well as a low noise level and maximum shock absorption of the drive.

FIG. 10 illustrates integration of the drive housing 7 into the frame geometry of the electric bicycle, and clarifies how the traction mechanism drive enables a narrow elongated structure of the drive device 1, independently of the distance between the pedal crankshaft 2 and the motor shaft 40, and how said traction mechanism drive further enables optimal adjustment to the configuration of the bicycle.

The substantial ground clearance in the area of the bottom bracket of the bicycle helps to avoid the risk of collision with obstacles such as stairs, curbs, and the like when the electric bicycle is being moved over irregularities, which risk would otherwise be high in the event of significant projecting parts of the drive housing 7.

The very compact and narrow design of the drive device 1 and thereby of the drive housing 7, achieved as a result of use of the traction mechanism drive, provides substantial ground clearance in the area of the pedal crankshaft 2 and thereby in the area of the "bottom bracket" of the bicycle, and [also] provides a narrow structure which allows one to attach multiple sprockets to the pedal crankshaft 2, if desired, thereby enabling an appreciable number of switching modes for a derailleur or hub switching mechanism. The integration of the drive housing 7 into the frame of the electric bicycle also optimizes the weight of the bicycle, so that the total weight is only slightly greater than that of a bicycle without a hybrid drive.

The invention claimed is:

1. A drive device for an electric bicycle with a frame containing a seat tube, a lower tube and lower stays of a rear structure of the electric bicycle, and with
    a drive housing in which a hollow shaft is mounted which is connected to a chain wheel of a chain drive of the electric bicycle,
    a pedal crankshaft arranged coaxially to the hollow shaft and couplable thereto, which crankshaft is connected to pedal cranks on each of its two ends; and
    an electric motor the output of which is coupled to the hollow shaft via a multistage drive, wherein the multistage drive comprises:
        a traction mechanism drive having a traction mechanism drive gear and a traction mechanism driven gear that are interconnected via a flexible traction mechanism, and
        a planetary drive having a fixed ring gear and planetary gears which are connected to a planetary gear carrier, and which planetary gears mesh with a sun gear and also engage an interior toothing of said ring gear;
    wherein the drive housing has a housing frame having a first pipe flange which is connected to the seat tube, a second pipe flange which is connected to the lower tube, and a third pipe flange which is connected to the lower stays of the rear structure of the frame of the electric bicycle, the housing frame also having a first housing cover on a first side and a second housing cover on a second side, which first and second housing covers are connected to the housing frame; and wherein the electric motor and the multistage drive are located inside the drive housing, wherein the motor shaft of the electric motor is connected to the sun gear of the planetary drive, and wherein the planetary gear carrier is connected to the traction mechanism drive gear located in the extension of the motor shaft, and wherein the traction mechanism driven gear can be coupled to the hollow shaft, wherein the drive device in a preassembled state can be inserted into the housing frame connected to the first housing cover and wherein the second housing cover can be connected to the housing frame for encapsulating the drive device.

2. The drive device according to claim 1, wherein the pipe flanges are connected to the seat tube, the lower tube and the lower stays of the rear structure by welding or soldering.

3. The drive device according to claim 1, wherein the first and second housing covers have openings for passing through the ends of the pedal crankshaft.

4. The drive device according to claim 1, wherein the traction mechanism drive comprises a belt drive or a chain drive.

5. The drive device according to claim 4, wherein the belt drive is formed in a single-stage manner with a toothed belt, flat belt, or V-belt as the flexible traction mechanism.

6. The drive device according to claim 4, wherein the chain drive is formed in a single-stage manner with a single or double roller chain as the flexible traction mechanism.

7. The drive device according to claim 1, wherein a first drive stage is comprised of a spur-toothed or helically toothed single-stage planetary drive having a fixed ring gear which has planetary gears which are connected to a planetary gear carrier, and which mesh with a sun gear which is connected to the motor shaft of the electric motor, which planetary gears also engage the interior toothing of said ring gear; and in that a second drive stage is comprised of a traction mechanism drive having a traction mechanism drive gear which is connected to the planetary gear carrier and is rotatably mounted on an extension of the motor shaft.

8. The drive device according to claim 7, wherein the traction mechanism drive comprises the traction mechanism drive gear which is connected to the planetary gear carrier of the planetary drive means, further comprises the flexible traction mechanism which engages the traction mechanism drive gear, and comprises a traction mechanism driven gear which engages the flexible traction mechanism and can be coupled to the hollow shaft.

9. The drive device according to claim 1, wherein a first drive stage comprises a traction mechanism drive with a traction mechanism drive wheel connected to the motor shaft of the electric motor, a traction mechanism driven wheel couplable to the hollow shaft; and the flexible traction mechanism and the second drive comprises a spur-toothed or helically toothed single-stage planetary drive having a sun gear that is connected to the traction mechanism driven gear and has planetary gears connected to a planetary gear carrier which planetary gears meshingly engage the sun gear; and a fixed ring gear, wherewith the planetary gears engage the inner toothing of the ring gear; and in that the planetary gear carrier is couplable to the hollow shaft.

10. The drive device according to claim 1, further comprising a deflecting device which is configured to deflect the flexible traction mechanism in an area between the traction mechanism drive gear and the traction mechanism driven gear.

11. The drive device according to claim 10, wherein the deflecting device is pre-tensioned in a direction of increasing a wrap angle of the traction mechanism drive gear and/or of the traction mechanism driven gear.

12. The drive device according to claim 10, wherein the deflecting device comprises a deflecting roller.

13. The drive device according to claim 12, wherein the deflecting roller is adjustable essentially perpendicularly to a longitudinal extent of the flexible traction mechanism.

14. The drive device according to claim 13, further comprising a spring element which urges the deflecting roller against the flexible traction mechanism.

* * * * *